United States Patent [19]
Rhodes

[11] 3,724,627
[45] Apr. 3, 1973

[54] POWER-TAKE OFF CLUTCH
[75] Inventor: Keith H. Rhodes, Winneconne, Wis.
[73] Assignee: J. I. Case Company, Racine, Wis.
[22] Filed: Mar. 1, 1972
[21] Appl. No.: 230,629

[52] U.S. Cl. ............................192/110 B, 192/66
[51] Int. Cl. ..............................................F16d 13/22
[58] Field of Search ..192/110 B, 98, 66, 70.19, 70.2, 192/85 CA; 64/8, 23

[56] References Cited

UNITED STATES PATENTS

| | | | |
|---|---|---|---|
| 1,931,182 | 10/1933 | Dombret | 192/70.19 |
| 3,062,346 | 11/1962 | Sharpe | 192/98 X |
| 3,434,369 | 3/1969 | Runkle | 64/23 X |
| 3,474,887 | 10/1969 | Hansen | 192/110 R X |

*Primary Examiner*—Benjamin W. Wyche
*Attorney*—Arthur J. Hansmann

[57] ABSTRACT

A power-take-off clutch having a shaft and a friction disc rotatable in unison and having a pulley piloted on the shaft to be axially moved into friction and therefore driving contact with the disc for the power-take-off. A series of ball bearings are on the shaft, including one for mounting the pulley, and other ball bearings are available for receiving an actuator which axially displaces the pulley for the drive engagement mentioned. The ball bearings have their inner races with hexagonally shaped bores which slide on the hexagonally shaped shaft, and thus the shaft and the inner races do not rotate relative to each other and they therefore do not wear out.

3 Claims, 2 Drawing Figures

PATENTED APR 3 1973 3,724,627

POWER-TAKE OFF CLUTCH

This invention relates to a power-take-off clutch of the type which has a rotatable shaft and a friction disc which is engaged with a power-take-off pulley.

BACKGROUND OF THE INVENTION

Power-take-off clutches are commonly known in the art, and they exist in many different forms. One such example is shown in U. S. Pat. No. 3,474,887 where a pulley is axially displaced into driving relation with a friction disc, and a lever type of actuator is employed for axially displacing the pulley into the driving engagement mentioned. In this type of clutch, the ball bearings utilized in contact with the actuator, for the purpose of permitting the axial displacement mentioned, and also the ball bearings for supporting the pulley itself, all tend to rotate relative to shaft at the inner races or inner bores of the bearing assemblies. Such rotation is undesirable in that it causes wear and vibration, and it requires that the supporting shaft and the bearing inner races and bores be hardened and otherwise strengthened in special manners. That is, since the bearing assemblies must slide freely axially of the shaft in the clutch described, the bearing inner bores and the shaft are inherently loose fitting and therefore the undesirable rotation occurs. Still further, since the loose fitting is required for axial movement of the bearing assemblies, as mentioned, this also results in a loose or unstable mounting of the pulley itself relative to the shaft.

Accordingly, it is an object of this invention to provide a power-take-off clutch which utilizes a plurality of bearing assemblies which can be moved axially of the shaft but which are otherwise stable with the shaft and which do not have the bearing inner races or inner bores rotate relative to the shaft. Accordingly, in accomplishing this object, the clutch of this invention avoids the wear caused by the relative rotation between the shaft and the contacting bearing bore surfaces.

Still another object of this invention is to provide a clutch which can be of the type having an actuator engaging bearing assemblies on the shaft and with the actuator and bearings permitting axial movement of the bearings on the shaft while the bearings, including a bearing for the pulley piloted on the shaft, all remain snug and stable relative to the shaft.

Still another object of this invention is to provide a power-take-off clutch assembly, including a shaft and a hub and bearing assemblies and a pulley, with the shaft and hub being a welded assembly which can be inexpensively and easily manufactured and precision made.

Other objects and advantages will become apparent upon reading the following description in light of the accompanying drawings.

DETAILED DESCRIPTION OF THE PREFERRED EMBODIMENT

Figure 1:
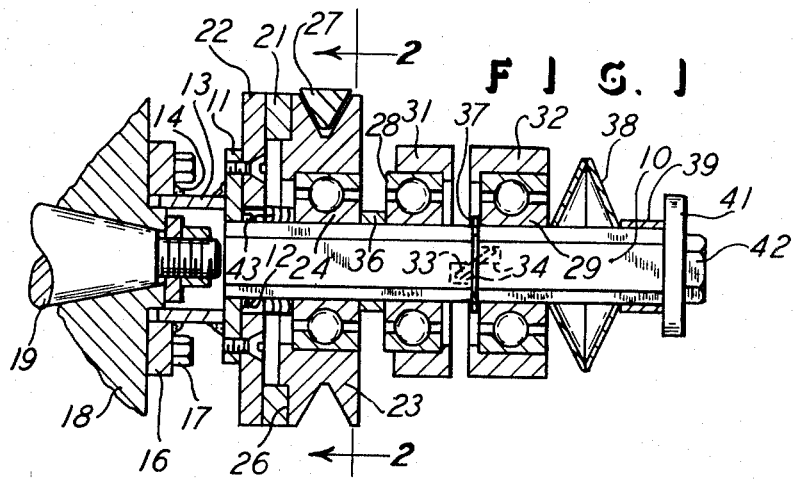
FIG. 1 is a longitudinal sectional view through a power-take-off clutch of this invention.

A clutch shaft 10 is rotatably driven through a hub 11 being welded to the shaft at 12 and being welded to a sleeve 13 at the weldment 14. A ring 16 is attached to the weldment 14 and thus to the sleeve 13, and bolts 17 extend through the ring 16 and into a fly wheel 18 of an engine which is not shown. An engine shaft 19 is also fragmentarily shown and is shown to be bolted to the flywheel 18. Thus the assembly of the engine shaft 19 and the hub 11 and clutch shaft 10 all rotate in unison.

A friction disc 21 is on a plate 22 which is bolted to the hub 11 so that the disc 21 rotates with the assembly just described. Also, a pulley 23 is piloted on the shaft 10 by means of one bearing assembly 24 which is shown to be a ball bearing for anti-frictionally supporting the pulley 23 relative to the shaft 10. Thus the pulley side face 26 contacts the friction disc 21 so that the pulley 23 can be driven by the disc 21 and a pulley belt 27, trained on the pulley 23, can be driven by the rotation of the shaft 10.

Two more ball bearing assemblies 28 and 29 are also piloted on the shaft 10 and they in turn support rings 31 and 32, respectively. An actuator 33 engages the slots 34 in the rings 31 and 32, and the actuator is in the form of an arm or lever which can be placed in a position parallel to the axis of shaft 10 to thus force the bearing assemblies 28 and 29 away from each other to thereby induce the frictional contact of the pulley 23 with the disc 21, as mentioned. This type of arrangement and lever actuator is that which is shown in U. S. Pat. No. 3,474,887. Thus a ring 36 extends between the bearing assemblies 24 and 31 so that the bearing 24 and its supported pulley 23 are urged toward the disc 21 for the driving engagement mentioned. Also, the snap ring 37 is on the shaft 10 to limit the movement of the bearing assembly 29 in the direction of the bearing assembly 28. Such movement of the bearing assembly 29 is induced by a Belleville spring 38 on the shaft 10 and in abutment with a sleeve 39 which in turn abuts a washer 41 held on the shaft 10 by a screw 42 extending into the end of the shaft 10. Finally, spring packs 43 extend between the disc 22 and the bearing assembly 24 to urge the bearing assembly 24 and therefore the pulley 23 away from the disc 21, at least when the clutch actuator 33 is released. The bearing assemblies and the ring 36 all slide axially on the shaft 10 for the clutching and de-clutching actions.

Figure 2:
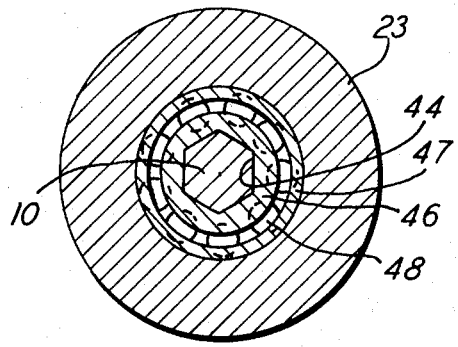
FIG. 2 is a sectional view taken along the line 2—2 of FIG. 1.

The shaft 10 is shown to be flat-sided in its cross-sectional form, and in fact it is a hexagonally shaped shaft, as seen in FIG. 2. Likewise, the inner bores 44 of all three bearing assemblies 24, 28, and 29 are flat sided and hexagonally shaped to mate with the shaft 10. Thus the bearings have their inner races 46 non-rotatably related to the chart 10, while the bearing outer races 47 will of course rotate relative to the shaft 10 by means of the bearing balls 48 being interposed between the races. All of the bearing inner races 46 are also capable of sliding axially on the shaft 10 for the bearing displacement described in order to clutch and de-clutch, as described. However, the bearing inner races 24, 28, and 29 cannot rotate relative to the shaft 10, that is they do not rotate on the shaft 10, so there is no wear to the shaft 10 nor to the bearing assemblies, due to any rotation therebetween. Further, the bearings are more stable on the shaft, compared to the bearings where the shaft is of a circular cross-section and the bearing inner bores are also circular, since that prior art arrangement does not permit the stability that the flat-sided telescopic arrangement permits.

What is claimed is:

1. In a power-take-off clutch, the combination of a rotatably mounted shaft, a plurality of anti-friction bearing assemblies mounted on said shaft and being axially movable thereon and each having an inner race and an outer race, a clutch friction disc mounted on said shaft and being rotatable therewith, a power-take-off pulley mounted on one of said bearing assemblies for rotation relative to said shaft and being disposed adjacent said disc to be selectively driven by said disc upon axial movement into contact with said disc, an actuator in engagement with said outer race of the other of said bearing assemblies for forcing thereon and causing said other bearing assembly to axially displace said one bearing assembly into a position of driving relation between said disc and said pulley, the improvement comprising said shaft and said bearing assemblies all having flat-sided telescoping surfaces to be non-rotatably mated together for precluding rotation between said inner races and said shaft while providing for the axial sliding of said bearing assemblies on said shaft.

2. The power-take-off clutch as claimed in claim 1, wherein said shaft and said inner races are all hexagonal in cross-sectional shape for presenting said flat-sided surfaces.

3. The power-take-off clutch as claimed in claim 2, including a spring on said shaft for urging said bearing assemblies toward said disc, and a drive member welded to said shaft adjacent said disc for rotating the assembly of said shaft and said disc.

* * * * *